(12) United States Patent
Min et al.

(10) Patent No.: US 8,716,892 B2
(45) Date of Patent: May 6, 2014

(54) ENERGY STORAGE SYSTEM AND METHOD OF CONTROLLING THE SAME

(75) Inventors: Byeong-Seon Min, Yongin-si (KR); Sung-Im Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 583 days.

(21) Appl. No.: 12/805,525

(22) Filed: Aug. 4, 2010

(65) Prior Publication Data
US 2011/0215649 A1 Sep. 8, 2011

(30) Foreign Application Priority Data

Mar. 2, 2010 (KR) ........................ 10-2010-0018565

(51) Int. Cl.
*H02J 1/00* (2006.01)
*H02J 3/00* (2006.01)

(52) U.S. Cl.
USPC .................. 307/72; 307/64; 307/65; 307/66; 307/80

(58) Field of Classification Search
USPC ....................................... 307/44–77
See application file for complete search history.

(56) References Cited

U.S. PATENT DOCUMENTS

| | | | | |
|---|---|---|---|---|
| 5,289,361 A | * | 2/1994 | Vinciarelli | 363/80 |
| 7,122,992 B2 | | 10/2006 | Lee | |
| 7,324,361 B2 | | 1/2008 | Siri | |
| 7,501,800 B2 | * | 3/2009 | Kim et al. | 323/207 |
| 7,880,334 B2 | * | 2/2011 | Evans et al. | 307/66 |
| 8,008,808 B2 | * | 8/2011 | Seeker et al. | 307/72 |
| 2004/0008009 A1 | * | 1/2004 | Fukaya | 322/44 |
| 2011/0133558 A1 | * | 6/2011 | Park | 307/66 |

FOREIGN PATENT DOCUMENTS

| | | |
|---|---|---|
| JP | 06-078473 A | 3/1994 |
| JP | 2002-270876 A | 9/2002 |
| JP | 2004-180467 A | 6/2004 |
| JP | 2009-033802 A | 2/2009 |
| KR | 10-2008-0062897 A | 7/2008 |

OTHER PUBLICATIONS

Office Action issued in corresponding Korean application, 10-2010-0018565, dated May 19, 2011.

* cited by examiner

*Primary Examiner* — Rexford Barnie
*Assistant Examiner* — Toan Vu
(74) *Attorney, Agent, or Firm* — Lee & Morse, P.C.

(57) ABSTRACT

An energy storage system and a method of controlling the energy storage system, the energy storage system including a power converting unit for converting a voltage output from the power generating system into a direct current (DC) link voltage, a bidirectional converter enabled to perform mutual conversion between an output voltage of the battery and the DC link voltage, a DC link unit for constantly maintaining a level of the DC link voltage, a bidirectional inverter for converting the DC link voltage into an alternating current (AC) voltage appropriate for the grid, and for converting an AC voltage of the grid into the DC link voltage, and an integrated controller for controlling the power converting unit, the bidirectional converter, and the bidirectional inverter, and for controlling operation modes of the energy storage system. In particular, the integrated controller may control operation modes in accordance with the DC link voltage.

15 Claims, 3 Drawing Sheets

ENERGY STORAGE SYSTEM AND METHOD OF CONTROLLING THE SAME

BACKGROUND

1. Field

One or more embodiments of the present invention relate to an energy storage system and a method of controlling the energy storage system.

2. Description of the Related Art

Due to problems of environment destruction, resource exhaustion, and the like, there is increasing demand for a system capable of efficiently using stored power. Also, there is increasing demand for renewable energy that does not cause pollution during power generation. An energy storage system is a system that connects renewable energy, a power storing battery, and existing power from a grid, and much research has been conducted to conform to environmental changes.

SUMMARY

Embodiments are therefore directed to an energy storage system and related methods, which substantially overcome one or more of the problems due to the limitations and disadvantages of the related art.

One or more embodiments of the present invention include an energy storage system and a method of controlling the energy storage system whereby an operation mode of the energy storage system may be rapidly determined.

Additional aspects will be set forth in part in the description which follows and, in part, will be apparent from the description, or may be learned by practice of the presented embodiments.

According to one or more embodiments of the present invention, an energy storage system for supplying power to a load, in conjunction with a power generating system, a battery and a grid includes a power converting unit for converting a voltage output from the power generating system into a direct current (DC) link voltage, a bidirectional converter enabled to perform mutual conversion between an output voltage of the battery and the DC link voltage, a DC link unit for constantly maintaining a level of the DC link voltage, a bidirectional inverter for converting the DC link voltage into an alternating current (AC) voltage appropriate for the grid, and for converting an AC voltage of the grid into the DC link voltage, and an integrated controller for controlling the power converting unit, the bidirectional converter, and the bidirectional inverter, and for controlling operation modes of the energy storage system.

The energy storage system may further include a detector for detecting the DC link voltage. The detector may a voltage distributor connected to both ends of the DC link unit for distributing the DC link voltage. A resistor string may be used as the voltage distributor.

When the integrated controller determines that the DC link voltage is within a predetermined range, the integrated controller may control the power converting unit and the bidirectional converter to maintain their current status.

When the integrated controller determines that the DC link voltage is less than a predetermined range, the integrated controller may control the power converting unit or the bidirectional converter to respectively increase an amount of power output from the power generating system or the battery.

When the integrated controller determines that the DC link voltage is greater than a predetermined range, the integrated controller may control the power converting unit or the bidirectional converter to respectively decrease an amount of power output from the power generating system or the battery.

According to one or more embodiments of the present invention, the method of controlling an energy storage system for supplying power to a load, in conjunction with a power generating system, a battery and a grid includes the operations of detecting a direct current (DC) link voltage output from the power generating system or the battery, and determining an operation mode of the energy storage system in accordance with the DC link voltage.

When the DC link voltage is within a predetermined range, determining may include selecting a normal operation mode as the operation mode, the normal operation mode including maintaining power from the power generating system or the battery at a current status.

When the DC link voltage is less than a predetermined range, determining may include selecting a over-load operation mode as the operation mode, the over-load operation mode including increasing an amount of power from the power generating system or the battery.

When the DC link voltage is greater than a predetermined range, determining may include selecting a low-load operation mode as the operation mode, the low-load operation mode including decreasing an amount of power from the power generating system or the battery.

According to one or more embodiments of the present invention, an energy storage system for supplying power to a load, in conjunction with a power generating system, a battery and a grid, includes a direct current (DC) link unit for constantly maintaining a DC link voltage output from the power generating system or the battery, and an integrated controller for determining an operation mode of the energy storage system in accordance with the DC link voltage.

When the DC link voltage is within a predetermined range, e.g., about 350V and about 390V, the integrated controller may select a normal operation mode in which a supply amount of power from the power generating system or the battery is maintained at a current status.

When the DC link voltage is less than a predetermined range, e.g., about 350V, the integrated controller may select an over-load operation mode in which a supply amount of power from the power generating system or the battery is increased.

When the DC link voltage is greater than a predetermined range, e.g., about 390V, the integrated controller may select a low-load operation mode in which a supply amount of power from the power generating system or the battery is decreased.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0018565, filed on Mar. 2, 2010, in the Korean Intellectual Property Office, and entitled: "Energy Storage System and Method of Controlling the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Reference will now be made in detail to embodiments, examples of which are illustrated in the accompanying drawings. As used herein, the term "and/or" includes any and all combinations of one or more of the associated listed items.

<Structure of an Energy Storage System>

Figure 1:
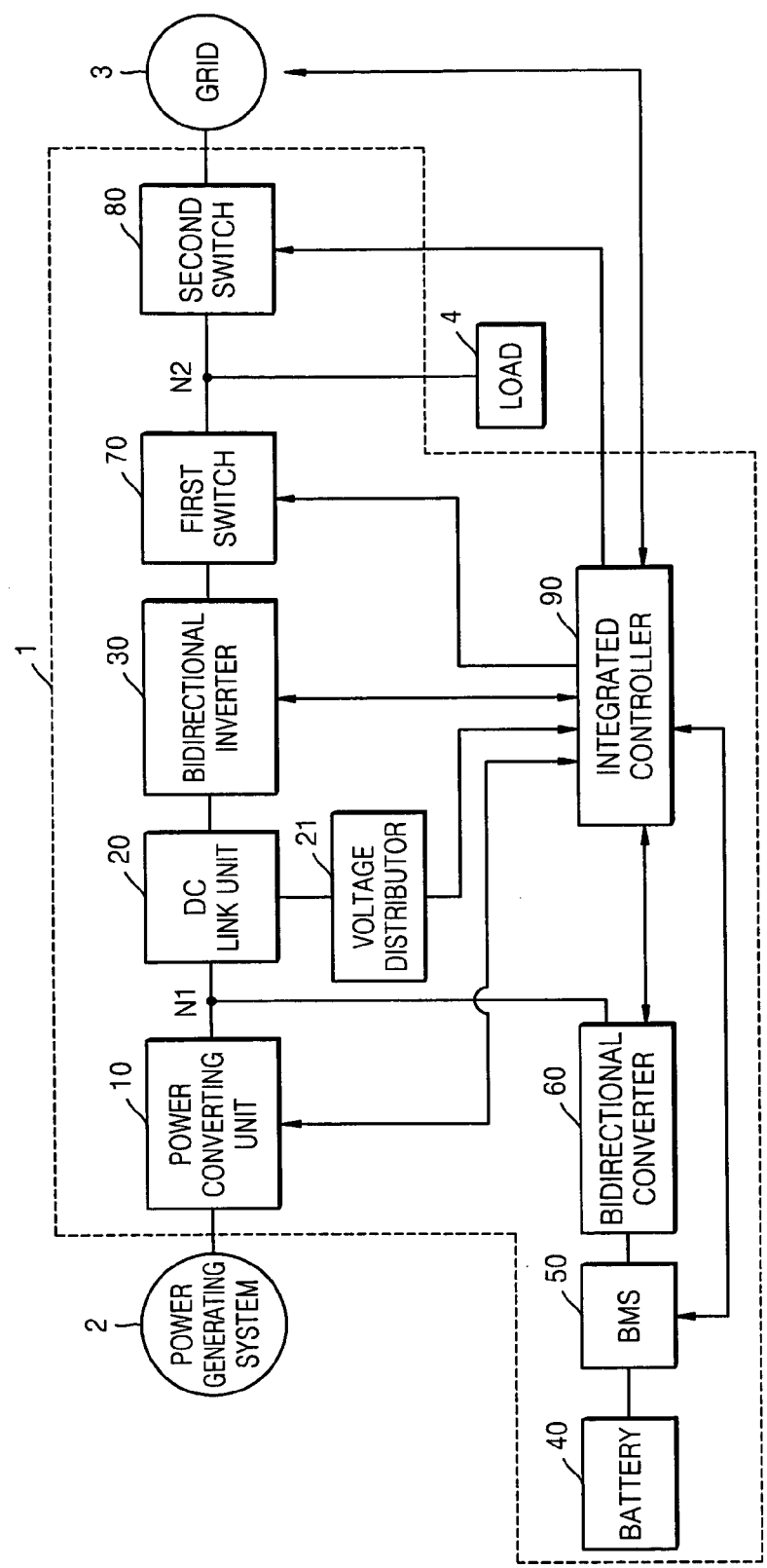
FIG. 1 illustrates a block diagram of a structure of an energy storage system according to an embodiment of the present invention.
Figure 2:
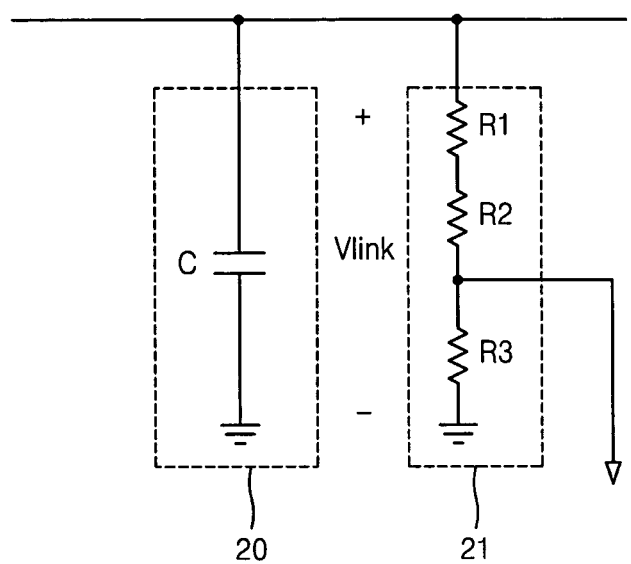
FIG. 2 illustrates a schematic diagram of a direct current (DC) link unit and a voltage divider according to an embodiment of the present invention.

FIG. 1 illustrates a block diagram of a structure of an energy storage system 1 according to an embodiment of the present invention. FIG. 2 illustrates a schematic diagram of a direct current (DC) link unit and a voltage divider according to an embodiment of the present invention.

Referring to FIG. 1, the energy storage system 1 supplies power to a load 4, in conjunction with a power generating system 2 and a grid 3.

The power generating system 2 is a system for generating power by using an energy source, and supplies the generated power to the energy storage system 1. The power generating system 2 may include a plurality of power generating modules arranged in parallel with each other, and may generate power via each of the power generating modules, so that the power generating system 2 may be a large capacity energy system.

The power generating system 2 may be a solar power generating system, a wind power generating system, a tidal power generating system, or the like. In addition, the power generating system 2 may include power generating systems for generating power by using a renewable energy including solar heat, terrestrial heat, or the like. In particular, a solar cell that generates electric energy using sunlight is easily installed in a house or a factory. Thus, solar cells, which may be distributed among many houses, may be used with the energy storage system 1.

The grid 3 may include a power generating station, a substation, a power transmission line, and the like. When the grid 3 is in a normal status, the grid 3 supplies power to the energy storage system 1 or the load 4, or receives power from the energy storage system 1. When the grid 3 is in an abnormal status, a power supply from the grid 3 to the energy storage system 1 or the load 4 is stopped, and a power supply from the energy storage system 1 to the grid 3 is also stopped.

The load 4 consumes power generated by the power generating system 2, power stored in a battery 40 of the energy storage system 1, or power supplied from the grid 3. The load may be a house, a factory, and so forth.

The energy storage system 1 may store power generated by the power generating system 2 in the battery 40 or may send the power to the grid 3. Also, the energy storage system 1 may deliver power stored in the battery 40 to the grid 3 or may store power supplied from the grid 3 in the battery 40. In addition, in an abnormal situation, e.g., when a power failure occurs in the grid 3, the energy storage system 1 may perform an Uninterruptible Power Supply (UPS) operation and then supply power to the load 4. When the grid 3 is in the normal status, the energy storage system 1 may supply power generated by the power generating system 2 or the power stored in the battery 40 to the load 4.

The energy storage system 1 may include a power converting unit 10, a DC link unit 20, a voltage distributor 21, a bidirectional inverter 30, the battery 40, a battery management system (BMS) 50, a bidirectional converter 60, a first switch 70, a second switch 80, and an integrated controller 90.

The power converting unit 10 is connected between the power generating system 2 and a first node N1. The power converting unit 10 delivers power generated by the power generating system 2 to the first node N1. Here, the power converting unit 10 converts the power from the power generating system 2 in such a way that an output voltage becomes a DC link voltage Vlink. The power converting unit 10 may be formed as a converter or a rectifier circuit depending on an output of the power generating system 2. When the power generating system 2 generates DC power, the power converting unit 10 may function as a converter for converting DC power into DC. Conversely, when the power generating system 2 generates AC power, the power converting unit 10 may function as a rectifier circuit for converting AC power into DC power. For example, when the power generating system 2 is a solar power generating system, the power converting unit 10 may be a maximum power point tracking (MPPT) converter for performing MPPT control so as to maximally obtain power generated by the power generating system 2 according to a change in solar radiation intensity, temperature, and the like.

The DC link unit 20 is connected between the first node N1 and the bidirectional inverter 30, and constantly maintains the DC link voltage Vlink at the first node N1. Due to an instant voltage drop in the power generating system 2 or the grid 3, or a peak load occurrence in the load 4, a voltage level at the first node N1 may be unstable. However, a voltage at the first node N1 should be maintained to insure stable operation of the bidirectional converter 60 and the bidirectional inverter 30. In this regard, the DC link unit 20 may be included for level stabilization of the DC link voltage Vlink at the first node N1. For example, as illustrated in FIG. 2, the DC link unit 20 may be embodied as a capacitor C. The capacitor C may include an electrolyte capacitor, a polymer capacitor, a multi-layer ceramic capacitor (MLCC), and so forth.

The voltage distributor 21 is connected between the DC link unit 20 and the integrated controller 90, and functions as a detector for detecting the DC link voltage Vlink. The voltage distributor 21 lowers a voltage applied to the bidirectional inverter 30, according to a constant reduction ratio, and then applies the lowered voltage to the integrated controller 90. For overall control of the energy storage system 1, the integrated controller 90 may detect the voltage of the DC link unit 20. However, the DC link voltage Vlink is a high voltage, and thus may not appropriately be directly applied to the integrated controller 90. Thus, the voltage distributor 21 lowers the DC link voltage Vlink so as to reduce the DC link voltage Vlink to a level appropriate for the integrated controller 90. As illustrated in FIG. 2, a resistor string formed by serially connecting a plurality of resistors R1 through R3 may be used as the voltage distributor 21. Afterward, the integrated controller 90 may be receive a voltage between the resistor R2 and the resistor R3, and then may calculate a level of the DC link voltage Vlink.

The bidirectional inverter 30 is a power converter connected between the DC link unit 20 and the first switch 70. The bidirectional inverter 30 converts the DC link voltage Vlink output from the power generating system 2 or the battery 40 into an AC voltage appropriate for the grid 3, and then outputs the AC voltage. Also, in order to store power from the grid 3 in the battery 40, the bidirectional inverter 30 rectifies an AC voltage of the grid 3, converts the AC voltage into the DC link voltage Vlink, and then outputs the DC link voltage Vlink. The bidirectional inverter 30 may include a filter for removing harmonics from the AC voltage output from the grid 3, and may include a phase locked loop (PLL) circuit for synchronizing a phase of an AC voltage output from the bidirectional inverter 30 with a phase of the AC voltage output from the grid 3 so as to prevent occurrence of reactive power. The bidirectional inverter 30 may perform additional functions, e.g., restriction of a voltage variation range, improvement of a power factor, removal of a DC component, transient phenomenon protection, and so forth.

The battery 40 receives and stores power generated by the power generating system 2 or power from the grid 3, and supplies stored power to the load 4 or the grid 3. The battery 40 may be formed of one or more battery cells, and each battery cell may include a plurality of bare cells. The battery 40 may be formed of various types of battery cells, e.g., a nickel-cadmium battery, a lead battery, a nickel metal hydrate (NiMH) battery, a lithium ion battery, a lithium polymer battery, or the like. A number of batteries 40 in the energy storage system 1 may be determined according to an amount of power, a design condition, or the like, as requested by the energy storage system 1. For example, when power consumption of the load 4 is large, the energy storage system 1 may include a plurality of batteries 40, and when the power consumption of the load 4 is small, the energy storage system 1 may include only one battery 40.

The BMS 50 is connected to the battery 40, and controls charging and discharging operations of the battery 40 according to a control of the integrated controller 90. In order to protect the battery 40, the BMS 50 may perform an over-charge protection function, an over-discharge protection function, an over-current protection function, an over-voltage protection function, an over-heat protection function, a cell balancing function, and the like. For these functions, the BMS 50 may monitor a voltage, a current, the temperature, a remaining amount of power, the lifetime, a charge status, and the like of the battery 40, and may transmit related information to the integrated controller 90. In the present embodiment, the BMS 50 is separately arranged from the battery 40, but the BMS 50 and the battery 40 may be formed as an integrated battery pack.

The bidirectional converter 60 DC-DC converts a voltage of power output from the battery 40 into the DC link voltage Vlink, that is, a voltage level requested by the bidirectional inverter 30. Also, the bidirectional converter 60 DC-DC converts charge power input via the first node N1 into a voltage level requested by the battery 40. Here, the charge power may indicate power generated by the power generating system 2 or power supplied from the grid 3 via the bidirectional inverter 30.

The first switch 70 and the second switch 80 are connected in series between the bidirectional inverter 30 and the grid 3, perform ON/OFF operations according to a control of the integrated controller 90, and thus control a flow of a current between the power generating system 2 and the grid 3. ON/OFF states of the first switch 70 and the second switch 80 may be determined according to statuses of the power generating system 2, the grid 3, and the battery 40. For example, when the load 4 requires a large amount of power, both of the first switch 70 and the second switch 80 may be turned ON so that both power from the power generating system 2 and power from the grid 3 may be used. When the power from the power generating system 2 and the power from the grid 3 do not fulfill the amount of power requested by the load 4, power stored in the battery 40 may be used. On the other hand, when a power failure occurs in the grid 3, the second switch 80 may be turned OFF and the first switch 70 may be turned ON. By doing so, the power from the power generating system 2 or the battery 40 may be supplied to the load 4, and thus it is possible to prevent a worker who works with a power line of the grid 3 from being struck by the power that is supplied to the load 4 and then flowed to the grid 3.

The integrated controller 90 monitors the statuses of the power generating system 2, the grid 3, the battery 40, and the load 4, and controls the power converting unit 10, the bidirectional inverter 30, the BMS 50, the bidirectional converter 60, the first switch 70, and the second switch 80 according to a result of the monitoring. Also, the integrated controller 90 may calculate the DC link voltage Vlink using a value of a voltage supplied from the voltage distributor 21, and may determine an operation mode of the energy storage system 1 according to a level of the calculated DC link voltage Vlink.

According to the related art, in order to determine the operation mode of the energy storage system 1, the integrated controller 90 directly measures the power consumption of the load 4, i.e., an amount of load. For measurement of the amount of load, the integrated controller 90 measures a voltage applied to the load 4 and a current flowing into the load 4, and calculates the amount of load by using the measured voltage and current. Afterward, the integrated controller 90 determines the operation mode according to the calculated amount of load. However, the aforementioned calculation procedure requires several processes so as to measure the amount of load. Thus, a measurement error may occur in the processes and the measurement of the amount of load may not be rapidly performed. Thus, it is difficult to rapidly cope with a change in the amount of load. In the present embodiment, the integrated controller 90 determines the operation mode of the energy storage system 1 according to the level of the DC link voltage Vlink.

<Operation of the Energy Storage System 1>

The energy storage system 1 may perform in various operation modes according to the statuses of the power generating system 2, the grid 3, and the load 4. Each operation mode is determined by the integrated controller 90, and the elements in the energy storage system 1 are operated according to the determined operation mode. The operation modes of the energy storage system 1 may include a normal operation mode, an over-load operation mode, and a low-load operation mode.

The normal operation mode (normal voltage mode) is performed when an amount of supplied power and an amount of load consumed by the load 4 balance each other. That is, the normal operation mode corresponds to a case in which a power supply from the power generating system 2, the grid 3, or the battery 40 is stabilized. Here, the DC link voltage Vlink may have a value of about 350-390V.

The over-load operation mode (low voltage mode) is performed when the amount of load consumed by the load 4 is greater than the amount of supplied power. That is, the over-load operation mode corresponds to a case in which the power supply from the power generating system 2, the grid 3, or the battery 40 is insufficient. Since the amount of supplied power is less than the amount of load, the DC link voltage Vlink is sharply reduced. For example, when the load 4 initiates its operations, the amount of load is sharply increased such that the load 4 enters an over-load status. Thus, at, this time, the DC link voltage Vlink may have a value equal to or less than about 350V.

The low-load operation mode (over-voltage mode) is performed when the amount of supplied power is greater than the amount of load consumed by the load 4. That is, the low-load operation mode corresponds to a case in which the power supply from the power generating system 2, the grid 3, or the battery 40 is excessive. Since the amount of supplied power is greater than the amount of load, the DC link voltage Vlink is increased. Thus, at this time, the DC link voltage Vlink may have a value equal to or greater than about 390V.

The aforementioned DC link voltage Vlink ranges for classifying the operation modes are exemplary and embodiments are not limited thereto. These ranges may vary according to environments in which the energy storage system 1 is installed.

Hereinafter, a method of determining the operation modes of the energy storage system 1 will now be described.

<Method of Determining the Operation Modes of the Energy Storage System 1>

Figure 3:
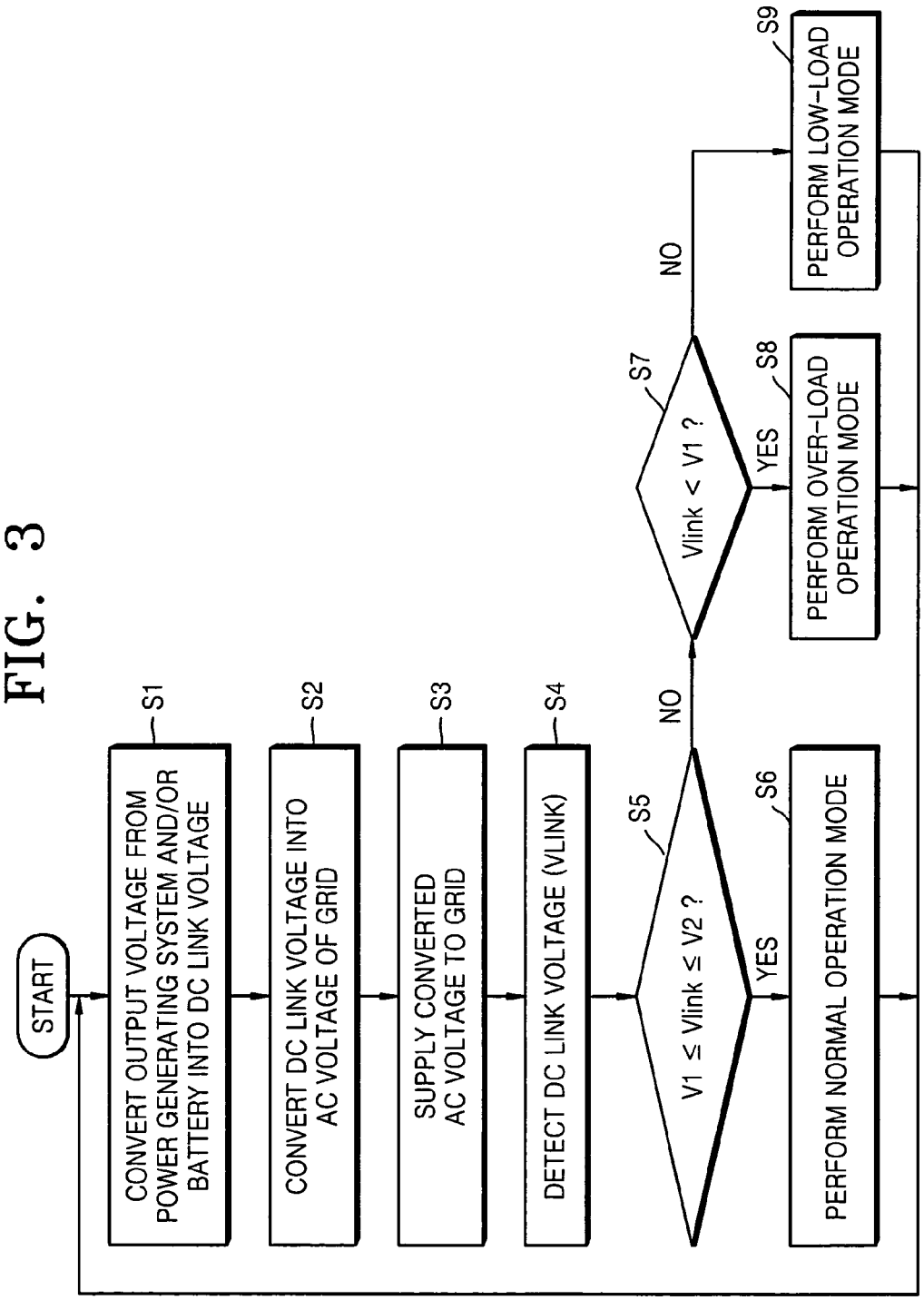
FIG. 3 illustrates a flowchart of a method of controlling the energy storage system, according to an embodiment of the present invention.

FIG. 3 illustrates a flowchart of a method of controlling the energy storage system 1, according to an embodiment of the present invention.

The load 4 is supplied power from the grid 3. Also, in a case where a power consumption of the load 4 is large, the energy storage system 1 supplies power from the power generating system 2 and/or the battery 40 to the load 4. For this supply, an output voltage of the power from the power generating system 2 and/or the battery 40 is converted into the DC link voltage Vlink, and then is applied to the bidirectional inverter 30 (operation S1).

DC power having a voltage value of the DC link voltage Vlink is converted into AC power so as to be supplied to the load 4. Here, the DC link voltage Vlink is converted into an AC voltage appropriate for the grid 3 (operation S2). The AC voltage converted by the bidirectional inverter 30 is supplied to the grid 3 or the load 4 (operation S3).

The integrated controller 90 detects the DC link voltage Vlink in real-time while performing operations S1 through S3 (operation S4). In the present embodiment, the integrated controller 90 detects the DC link voltage Vlink after operation S3 is performed, but it is not limited thereto. Thus, operation S4 may be continually performed while the energy storage system 1 is operated.

Meanwhile, the integrated controller 90 determines in which range the detected DC link voltage Vlink belongs (operations S5 and S7). When the detected DC link voltage Vlink is equal to or greater than a first reference voltage V1 and equal to or less than a second reference voltage V2, the integrated controller 90 determines that the detected DC link voltage Vlink belongs to a normal range so that the integrated controller 90 performs the normal operation mode (operation S6). The normal operation mode indicates a status in which power is stably supplied to the load 4. Thus, the integrated controller 90 controls each element so as to maintain a current status in the normal operation mode.

For example, when a power failure occurs in the grid 3, the first switch 70 is turned ON and the second switch 80 is turned OFF, and only the power from the power generating system 2 and the battery 40 is supplied to the load 4. Thus, in this case, the integrated controller 90 controls the power converting unit 10 and the bidirectional converter 60 to maintain their operations as the normal operation mode. The first reference voltage V1 and the second reference voltage V2 may be about 350V and 390V, respectively, but are not limited thereto, i.e., the first reference voltage V1 and the second reference voltage V2 may have different voltage values as appropriate.

When the detected DC link voltage Vlink is less than the first reference voltage V1 (operations S5 and S7), the integrated controller 90 determines that the detected DC link voltage Vlink is a low voltage so that the integrated controller 90 performs the over-load operation mode (operation S8). The over-load operation mode indicates a status in which power supplied to the load 4 is insufficient. Thus, it is necessary for the integrated controller 90 to control the energy storage system 1 so as to increase the power supplied to the load 4. That is, the integrated controller 90 controls the power converting unit 10 and/or the bidirectional converter 60 to increase an amount of power output from the power generating system 2 and the battery 40, respectively.

In a case where the detected DC link voltage Vlink is greater than the second reference voltage V2 (operations S5 and S7), the integrated controller 90 determines that the detected DC link voltage Vlink is a high voltage so that the integrated controller 90 performs the low-load operation mode (operation S9). The low-load operation mode indicates a status in which an excessive amount of power is supplied to the load 4. Thus, it is necessary for the integrated controller 90 to control the energy storage system 1 so as to decrease the power supplied to the load 4. That is, the integrated controller 90 controls the power converting unit 10 and/or the bidirectional converter 60 to decrease an amount of power output from the power generating system 2 and the battery 40, respectively.

As described above, the integrated controller 90 of the energy storage system 1 determines the operation modes of the energy storage system 1 by using the DC link voltage Vlink, so that a stable and rapid control of the energy storage system 1 is possible.

A program for executing the controlling method in the energy storage system according to the embodiments may be stored in a recording medium. Here, the recording medium indicates a medium that is processor-readable and may include a semiconductor recording medium (e.g., a flash memory), a magnetic recording medium (e.g., ROM, a hard disk, and the like), or the like. The medium may be read by a processor, e.g., the integrated controller 90 of FIG. 1, and may be executed in the processor.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An energy storage system for supplying power to a load, in conjunction with a power generating system, a battery, and a grid, the energy storage system comprising:
    a power converting unit for converting a voltage output from the power generating system into a direct current (DC) link voltage;
    a bidirectional converter configured to perform mutual conversion between an output voltage of the battery and the DC link voltage;
    a DC link unit for constantly maintaining a level of the DC link voltage;
    a bidirectional inverter for converting the DC link voltage into an alternating current (AC) voltage appropriate for the grid and for converting an AC voltage of the grid into the DC link voltage;
    a detector for detecting the DC link voltage; and
    an integrated controller for controlling the power converting unit, the bidirectional converter, and the bidirectional inverter, and for controlling operation modes of the energy storage system in accordance with the DC link voltage, wherein the integrated controller selects an operation mode by comparing the detected DC link voltage to a first voltage and to a second voltage, different from the first voltage, the first to second voltages defining a predetermined range.

2. The energy storage system as claimed in claim 1, wherein the detector is a voltage distributor that is connected to both ends of the DC link unit for distributing the DC link voltage.

3. The energy storage system as claimed in claim 2, wherein a resistor string is used as the voltage distributor.

4. The energy storage system as claimed in claim 1, wherein, when the integrated controller determines that the DC link voltage is within the predetermined range, the integrated controller controls the power converting unit and the bidirectional converter to maintain their current status.

5. The energy storage system as claimed in claim 1, wherein, when the integrated controller determines that the DC link voltage is less than the predetermined range, the integrated controller controls the power converting unit or the bidirectional converter to respectively increase an amount of power output from the power generating system or the battery.

6. The energy storage system as claimed in claim 1, wherein, when the integrated controller determines that the DC link voltage is greater than the predetermined range, the integrated controller controls at least one of the power converting unit and the bidirectional converter to respectively decrease an amount of power output from the power generating system or the battery.

7. A method of controlling an energy storage system for supplying power to a load, in conjunction with a power generating system, a battery, and a grid, the method comprising:
   detecting a direct current (DC) link voltage output from the power generating system or the battery;
   determining an operation mode of the energy storage system in accordance with the DC link voltage; and
   comparing the detected DC link voltage to a first voltage and a second voltage, different from the first voltage, the first to second voltages defining a predetermined range,
   wherein, when the DC link voltage is less than the predetermined range, determining comprises selecting an over-load operation mode as the operation mode, the over-load operation mode including increasing an amount of power supplied from the power generating system or the battery, and
   wherein, when the DC link voltage is greater than the predetermined range, determining comprises selecting a low-load operation mode as the operation mode, the low-load operation mode including decreasing an amount of power supplied from the power generating system or the battery.

8. The method as claimed in claim 7, wherein, when the DC link voltage is within the predetermined range, determining comprises selecting a normal operation mode as the operation mode, the normal operation mode including maintaining an amount of power supplied from the power generating system or the battery at a current level.

9. An energy storage system for supplying power to a load, in conjunction with a power generating system, a battery, and a grid, the energy storage system comprising:
   a direct current (DC) link unit for constantly maintaining a DC link voltage output from the power generating system or the battery; and
   an integrated controller for determining an operation mode of the energy storage system in accordance with the DC link voltage, wherein the integrated controller selects an operation mode by comparing the detected DC link voltage to a first voltage and a second voltage, different from the first voltage, the first to second voltages defining a predetermined range.

10. The energy storage system as claimed in claim 9, wherein, when the DC link voltage is within the predetermined range, the integrated controller selects a normal operation mode in which a supply amount of power from the power generating system or the battery is maintained at a current status.

11. The energy storage system as claimed in claim 10, wherein the predetermined range is between about 350V and about 390V.

12. The energy storage system as claimed in claim 9, wherein, when the DC link voltage is less than the predetermined range, the integrated controller selects an over-load operation mode in which a supply amount of power from the power generating system or the battery is increased.

13. The energy storage system as claimed in claim 12, wherein a low end of the predetermined range is about 350V.

14. The energy storage system as claimed in claim 9, wherein, when the DC link voltage is greater than the predetermined range, the integrated controller selects a low-load operation mode in which a supply amount of power from the power generating system or the battery is decreased.

15. The energy storage system as claimed in claim 14, wherein a high end of the predetermined range is about 390V.

* * * * *